United States Patent
Chang

(10) Patent No.: US 9,424,686 B2
(45) Date of Patent: Aug. 23, 2016

(54) GRAPHICS PROCESSING CIRCUIT HAVING SECOND VERTEX SHADER CONFIGURED TO REUSE OUTPUT OF FIRST VERTEX SHADER AND/OR PROCESS REPACKED VERTEX THREAD GROUP AND RELATED GRAPHICS PROCESSING METHOD THEREOF

(71) Applicant: MEDIATEK INC., Hsin-Chu (TW)

(72) Inventor: Jia-Yang Chang, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 218 days.

(21) Appl. No.: 14/454,738

(22) Filed: Aug. 8, 2014

(65) Prior Publication Data

US 2016/0042560 A1 Feb. 11, 2016

(51) Int. Cl.
| | |
|---|---|
| *G06T 15/50* | (2011.01) |
| *G06T 15/60* | (2006.01) |
| *G06T 15/80* | (2011.01) |
| *G06T 1/20* | (2006.01) |
| *G06T 1/60* | (2006.01) |
| *G06T 15/00* | (2011.01) |

(52) U.S. Cl.
CPC . *G06T 15/80* (2013.01); *G06T 1/20* (2013.01); *G06T 1/60* (2013.01); *G06T 15/005* (2013.01)

(58) Field of Classification Search
None
See application file for complete search history.

(56) References Cited

U.S. PATENT DOCUMENTS

| | | | | |
|---|---|---|---|---|
| 7,468,726 B1* | 12/2008 | Wloka | ..................... | G06T 15/40 345/419 |
| 7,958,498 B1* | 6/2011 | Brown | ..................... | G06F 8/443 717/139 |
| 8,436,854 B2* | 5/2013 | Jiao | ........................... | G06T 1/20 345/421 |
| 2008/0030513 A1* | 2/2008 | Jiao | ....................... | G06T 15/005 345/530 |
| 2010/0097377 A1 | 4/2010 | Hasselgren | | |

OTHER PUBLICATIONS

Multimedia Application Division Freescale semiconductor, Inc. Austin, TX, "High-End 3D Graphics with OpenGL ES 2.0" Jan. 2010, Document No. AN3994 Rev. 0; pp. 1-24.*
Shameem Akhter et al., Understanding and Avoiding Memory Issues with Multi-core Processors, Dec. 11, 2008, pp. 1-5, XP002752866, URL: http://www.drdobbs.com/parallel/understanding-and-avoiding-memory-issues/212400410.
opengl.org, Post Transform Cache, Apr. 10, 2014, pp. 1-2, XP002752867, URL: https://www.opengl.org/wiki_132/index.php?title=Post_Transform_Cache&oldid=11458.

* cited by examiner

*Primary Examiner* — Kee M Tung
*Assistant Examiner* — Frank Chen
(74) *Attorney, Agent, or Firm* — Winston Hsu; Scott Margo

(57) ABSTRACT

A graphics processing circuit includes a buffer, a first vertex shader, and a second vertex shader. The first vertex shader generates at least coordinate values of a plurality of vertices to the buffer. The second vertex shader reads at least a portion of buffered coordinate values from the buffer, and reuses at least the portion of the buffered coordinate values to generate a value of at least one user-defined variable.

20 Claims, 9 Drawing Sheets

|  | SIMD lanes | | | |
|---|---|---|---|---|
|  | L0 | L1 | L2 | L3 |
| G0 | $T_{00}$ | $T_{01}$ | $T_{02}$ | $T_{03}$ |
| G1 | $T_{10}$ | $T_{11}$ | $T_{12}$ | $T_{13}$ |
| G2 | $T_{20}$ | $T_{21}$ | $T_{22}$ | $T_{23}$ |
| G3 | $T_{30}$ | $T_{31}$ | $T_{32}$ | $T_{33}$ |
| G4 | $T_{40}$ | $T_{41}$ | $T_{42}$ | $T_{43}$ |

Vertex thread groups

FIG. 9

|  | SIMD lanes | | | |
|---|---|---|---|---|
|  | L0' | L1' | L2' | L3' |
| G0' | $T_{00}$ | $T_{02}$ | $T_{03}$ | $T_{10}$ |
| G1' | $T_{11}$ | $T_{12}$ | $T_{20}$ | $T_{21}$ |
| G2' | $T_{23}$ | $T_{30}$ | $T_{31}$ | $T_{32}$ |
| G3' | $T_{33}$ | $T_{41}$ | $T_{42}$ | $T_{43}$ |

Vertex thread groups

FIG. 10

GRAPHICS PROCESSING CIRCUIT HAVING SECOND VERTEX SHADER CONFIGURED TO REUSE OUTPUT OF FIRST VERTEX SHADER AND/OR PROCESS REPACKED VERTEX THREAD GROUP AND RELATED GRAPHICS PROCESSING METHOD THEREOF

BACKGROUND

The disclosed embodiments of the present invention relate to graphics processing, and more particularly, to a graphics processing circuit having a second vertex shader configured to reuse an output of a first vertex shader and/or process a repacked vertex thread group and related graphics processing method thereof.

Current graphics processing includes systems and methods developed to perform specific operations on graphics data. Traditionally, a graphics processing unit may only use fixed computational units to process the graphics data. More recently, a portion of the graphics processing unit may be implemented using programmable computational units to support a wider variety of operations. For example, a vertex shader may be made programmable.

In one conventional design, the vertex shading operation may be split into a first vertex shading stage and a second vertex shading stage. In general, the vertex shading operation includes multiple instructions. Though the vertex shading operation may be divided into two vertex shading stages, the instructions cannot be divided into two mutually exclusive instruction sets for the vertex shading stages. For example, instructions of the vertex shading operation contain first instructions, second instructions and third instructions. One instruction set executed by the first vertex shading stage may include the first instructions and the second instructions, while the other instruction set executed by the second vertex shading stage may include the first instructions and the third instructions. The conventional design of dividing the vertex shading operation into two vertex shading stages may allow the first vertex shading stage to skip the execution of the third instructions; however, the first instructions executed by the first vertex shading stage are needed to be executed by the second vertex shading stage again. As a result, the conventional design of dividing the vertex shading operation into two vertex shading stages is not efficient in instruction execution.

SUMMARY

In accordance with exemplary embodiments of the present invention, a graphics processing circuit having a second vertex shader configured to reuse an output of a first vertex shader and/or process a repacked vertex thread group and related graphics processing method thereof are proposed.

According to a first aspect of the present invention, an exemplary graphics processing circuit is disclosed. The exemplary graphics processing circuit includes a buffer, a first vertex shader, and a second vertex shader. The first vertex shader is configured to generate at least coordinate values of a plurality of vertices to the buffer. The second vertex shader is configured to read at least a portion of buffered coordinate values from the buffer, and reuse at least the portion of the buffered coordinate values to generate a value of at least one user-defined variable.

According to a second aspect of the present invention, an exemplary graphics processing method is disclosed. The exemplary graphics processing method includes: performing a first vertex shading operation to generate at least coordinate values of a plurality of vertices to a buffer; and performing a second vertex shading operation to read at least a portion of buffered coordinate values from the buffer, and reuse at least the portion of the buffered coordinate values to generate a value of at least one user-defined variable.

According to a third aspect of the present invention, an exemplary graphics processing circuit is disclosed. The exemplary graphics processing circuit includes a buffer, a first vertex shader and a second vertex shader. The first vertex shader is configured to generate coordinate values of a plurality of vertices, and store at least one intermediate value, each associated with generation of a coordinate value of one of the vertices, to the buffer. The second vertex shader is configured to read the at least one intermediate value from the buffer, and reuse the at least one intermediate value to generate a value of at least one variable.

According to a fourth aspect of the present invention, an exemplary graphics processing method is disclosed. The exemplary graphics processing method includes: performing a first vertex shading operation to generate coordinate values of a plurality of vertices, and store at least one intermediate value, each associated with generation of a coordinate value of one of the vertices, to a buffer; and performing a second vertex shading operation to read the at least one intermediate value from the buffer, and reuse the at least one intermediate value to generate a value of at least one variable.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 9 is a diagram illustrating a SIMD execution flow without compaction.

FIG. 10 is a diagram illustrating a SIMD execution flow with compaction.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

One technical feature of the present invention is to reuse coordinate values generated from a first vertex shading stage to generate variable values (e.g., user-defined variable values such as varying variable values), thus reducing the number of instructions/calculations performed in a second vertex shading stage. Another technical feature of the present invention is to reuse intermediate values generated from the first vertex shading stage to generate variable values (e.g., user-defined variable values such as varying variable values), thus reducing the number of instructions/calculations performed in the second vertex shading stage. Yet another technical feature of the present invention is to repack non-rejected vertices in original vertex thread groups having one or more rejected vertices to generate a new vertex thread group filled with non-rejected vertices only, thus improving the performance of the second vertex shading stage. Further details of the proposed vertex shading design are described as below.

Figure 1:
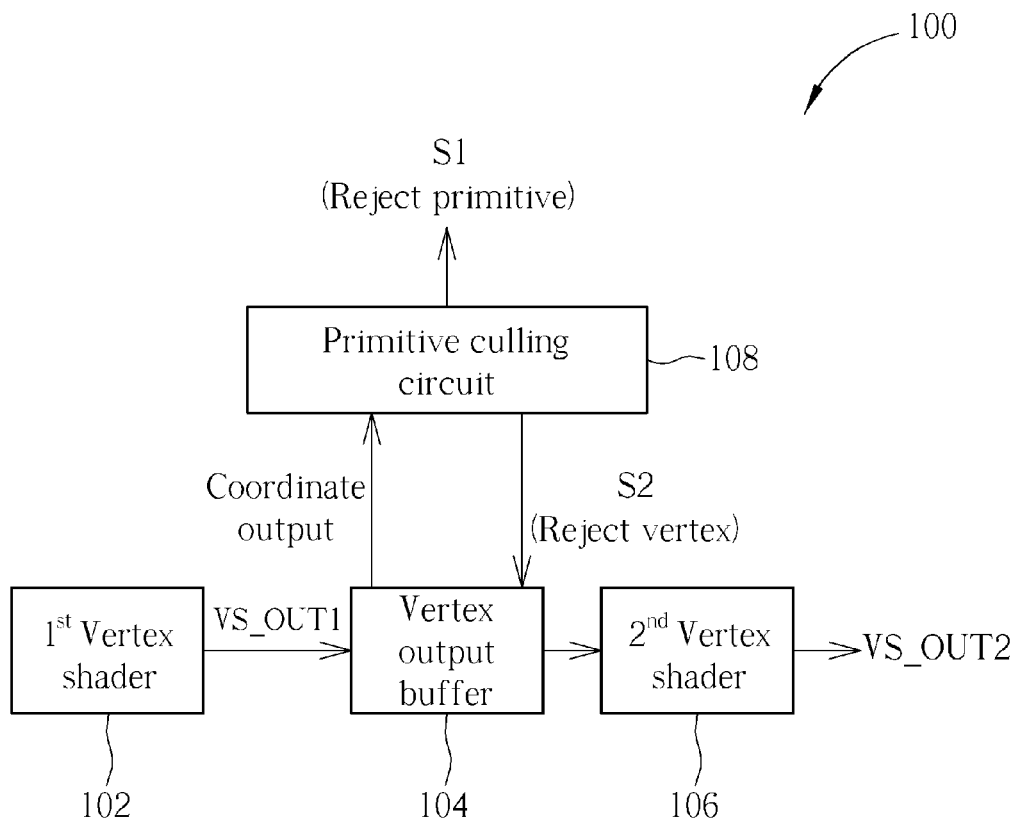
FIG. 1 is a diagram illustrating a graphics processing circuit according to a first embodiment of the present invention.

FIG. 1 is a diagram illustrating a graphics processing circuit according to a first embodiment of the present invention. By way of example, but not limitation, the graphics processing circuit 100 may be part of a graphics processing unit (GPU) used in an electronic device. In this embodiment, the graphics processing circuit 100 includes a first vertex shader 102, a vertex output buffer 104, a second vertex shader 106, and a primitive culling circuit 108. It should be noted that only the components pertinent to the present invention are shown in FIG. 1. In practice, the graphics processing circuit 100 may have additional circuit blocks, depending upon actual design consideration.

The vertex output buffer 104 is coupled to the first vertex shader 102, the primitive culling circuit 108, and the second vertex shader 106. Hence, the vertex output buffer 104 is accessible to each of the first vertex shader 102, the primitive culling circuit 108, and the second vertex shader 106. The first vertex shader 102 is configured to generate coordinate values of a plurality of vertices within the image geometry, and store the coordinate values of the vertices into the vertex output buffer 104. That is, the data output VS_OUT1 generated from the first vertex shader 102 to the vertex output buffer 104 includes vertex coordinate values. The primitive culling circuit 108 is configured to find primitives associated with vertices in the vertex output buffer 104, and performs a culling process to reject certain primitives. For example, the primitive culling circuit 108 refers to the coordinate values of the vertices in the vertex output buffer 104 to distinguish between visible primitives and non-visible primitives, and generates one notification signal S1 to instruct a primitive buffer (not shown) to remove rejected primitives (e.g., non-visible primitives). In addition, after the rejected primitives (e.g., non-visible primitives) are determined, the primitive culling circuit 108 further generates another notification signal S2 to instruct the vertex output buffer 104 to reject vertices associated with the rejected primitives (e.g., non-visible primitives) by removing buffered coordinate values of the rejected vertices. Since the non-visible primitives will not be displayed on a display screen, removing the non-visible primitives can reduce the work load of the following primitive processing circuit. Similarly, removing vertices associated with non-visible primitives can reduce the work load of the following vertex processing circuit (e.g., the second vertex shader 106). That is, the second vertex shader 106 does not waste time on processing vertices associated with the rejected vertices.

The second vertex shader 106 is configured to read at least a portion (i.e., part or all) of buffered coordinate values from the vertex output buffer 104, and reuse at least the portion of the buffered coordinate values to generate a value of at least one user-defined variable. For example, the at least one user-defined variable may include at least one varying variable as defined by OpenGL ES (OpenGL for Embedded Systems). Since the coordinate values generated from the first vertex shader 102 are buffered and reused, the number of instructions/calculations executed by the second vertex shader 106 can be reduced greatly.

Figure 2:
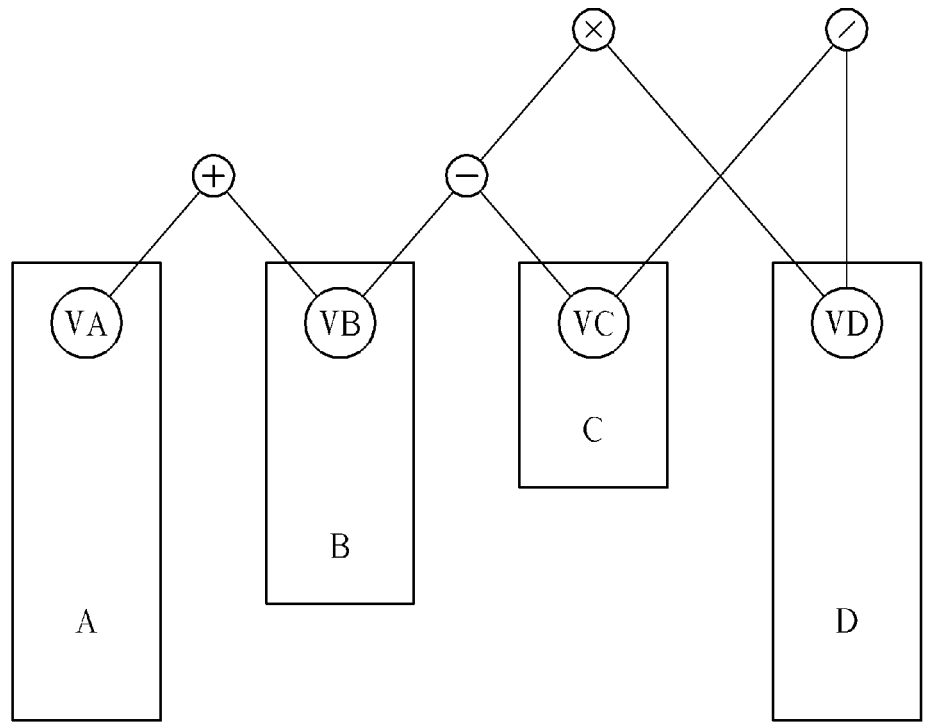
FIG. 2 is a simplified expression tree diagram illustrating an original vertex shading operation.
Figure 3:
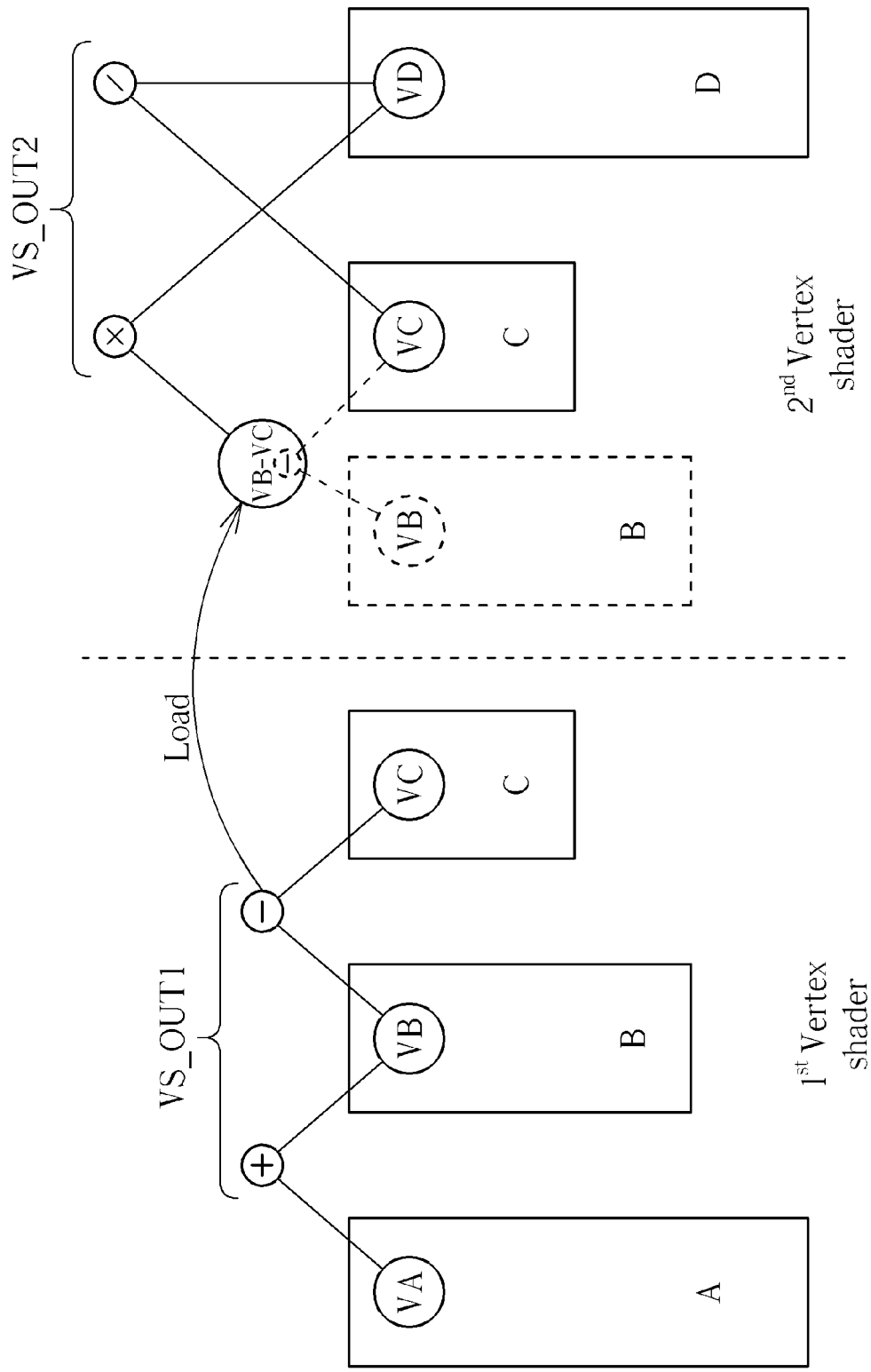
FIG. 3 is a simplified expression tree diagram illustrating a first vertex shading operation performed by a first vertex shader in FIG. 1 and a second vertex shading operation performed by a second vertex shader in FIG. 1 according to an embodiment of the present invention.

Please refer to FIG. 2 in conjunction with FIG. 3. FIG. 2 is a simplified expression tree diagram illustrating an original vertex shading operation. FIG. 3 is a simplified expression tree diagram illustrating a first vertex shading operation performed by the first vertex shader 102 in FIG. 1 and a second vertex shading operation performed by the second vertex shader 106 in FIG. 1 according to an embodiment of the present invention. As shown in FIG. 2, the expression of the original vertex shading operation may include sub-trees A, B, C, D, where each of the sub-trees A, B, C, D may include a plurality of sub-expressions, each corresponding to one instruction. The sub-tree A generates an output value VA, the sub-tree B generates an output value VB, the sub-tree C generates an output value VC, and the sub-tree D generates an output value VD. In this example, the original vertex shading operation is executed to produce four final output values (VA+VB), (VB−VC), (VB−VC)×VD, and (VC/VD), where (VA+VB) is an output of the operand "+", (VB−VC) is an output of the operand "−", (VB−VC)×VD is an output of the operand "X", and (VC/VD) is an output of the operand "/".

When the graphics processing circuit 100 is employed, the original vertex shading operation is separated into a first vertex shading operation and a second vertex shading operation with a reduced number of overlapped instructions (i.e., the same instructions executed in both of the first vertex shading operation and the second vertex shading operation). In this example, the first vertex shader 102 is responsible for generating two final output values (VA+VB) and (VB−VC) which may be vertex coordinate values; and the second vertex shader 104 is responsible for generating two final output values (VB−VC)×VD and (VC/VD) which may be varying variable values. As can be seen from FIG. 3, the first vertex shader 102 needs to execute at least instructions in sub-trees A, B, C and instructions corresponding to the operands "+" and "−", and then generates the final output values (VA+VB) and (VB−VC) to the vertex output buffer 104. Since the final output value (VB−VC) is already available in the vertex output buffer 104, the second vertex shader 106 may directly load the final output value (VB−VC) from the vertex output buffer 104, and reuse the output value (VB−VC) to thereby skip the execution of instructions included in the sub-tree B. In this way, the second vertex shader 106 executes instructions in sub-trees C, D and instructions corresponding to the operands "*" and "/", and then generates the final output values (VB−VC)×VD and (VC/VD). Compared to a conventional two-stage design with a second vertex shading stage needed to generate the final output values (VB−VC)×VD and (VC/VD) by executing instructions included in sub-trees B, C, D and instructions corresponding to the operands "−", "X"

and "/", the proposed graphics processing circuit 100 allows the second vertex shader 106 to execute a reduced number of instructions due to the reuse of first vertex shader's output (e.g., vertex coordinate value (s) generated from the first vertex shader 102).

An example of reusing the first vertex shader's output, including at least one vertex coordinate value, may be illustrated by following program codes.

```
attribute highp vec3 fm_position;
attribute mediump vec2 fm_weights;
attribute mediump vec2 fm_matrix_indices;
uniform highp mat4 fm_world_to_clip_matrix;
uniform highp vec4 fm_bones_3x4[90];
varying mediump vec4 v_position;
void main ( )
{
   mediump int index1 = 3 * int(fm_matrix_indices.x);
   mediump int index2 = 3 * int(fm_matrix_indices.y);
   highp vec4 b1 = fm_weights.x * fm_bones_3x4[index1] +
   fm_weights.y
   * fm_bones_3x4[index2];
   highp vec4 b2 = fm_weights.x * fm_bones_3x4[index1] + 1] +
   fm_weights.y * fm_bones_3x4[index2+1];
   highp vec4 b3 = fm_weights.x * fm_bones_3x4[index1 + 2] +
   fm_weights.y * fm_bones_3x4[index2+2];
   // matrix is packed into 3 vectors
   highp mat4 skin_to_world_matrix;
   skin_to_world_matrix[0] = vec4(b1.xyz, 0.0);
   skin_to_world_matrix[1] = vec4(b1.w, b2.xy, 0.0);
   skin_to_world_matrix[2] = vec4(b2.zw, b3.x, 0.0);
   skin_to_world_matrix[3] = vec4(b3.yzw, 1.0);
   highp vec4 position_in_world = skin_to_world_matrix *
   vec4(fm_position, 1.0);
   highp vec4 position = fm_world_to_clip_matrix *
   position_in_world;
   v_position = vec4(position.zzz, 1.0) * 0.5 + 0.5;
   gl_position = position;
}
```

When the exemplary program codes are compiled and then executed, the first vertex shader 102 calculates the vertex coordinate value "gl_position", and the second vertex shader 106 needs to calculate the varying variable "v_position" only. In addition, the second vertex shader 106 can get "position.z" from the vertex coordinate value "gl_position" generated by the first vertex shader 102. With the reuse of first vertex shader's output, the instruction count can be changed from 75 to 10, thus leading to enhanced performance of the second vertex shader 106. It should be noted that the above is for illustrative purposes only, and is not meant to be a limitation of the present invention. The number of saved instructions may vary under different instruction set architecture and/or different compiler design. In practice, any graphics processing circuit using the proposed vertex shader design to reduce the instruction count falls within the scope of the present invention.

The highest node in the sub-tree C is a boundary node whose value is involved in a direct calculation of first vertex shader's output (e.g., (VB−VC)) and a direct calculation of second vertex shader's output (e.g., (VC/VD)). Hence, the output value VC of the sub-tree C may be regarded as an intermediate value of the vertex shading processing. If the output value VC is also stored into the vertex output buffer 104, the second vertex shader 106 may directly load the output value VC from the vertex output buffer 104 and reuse the output value VC to skip more instructions, thus leading to better performance of the second vertex shader 106.

Figure 4:
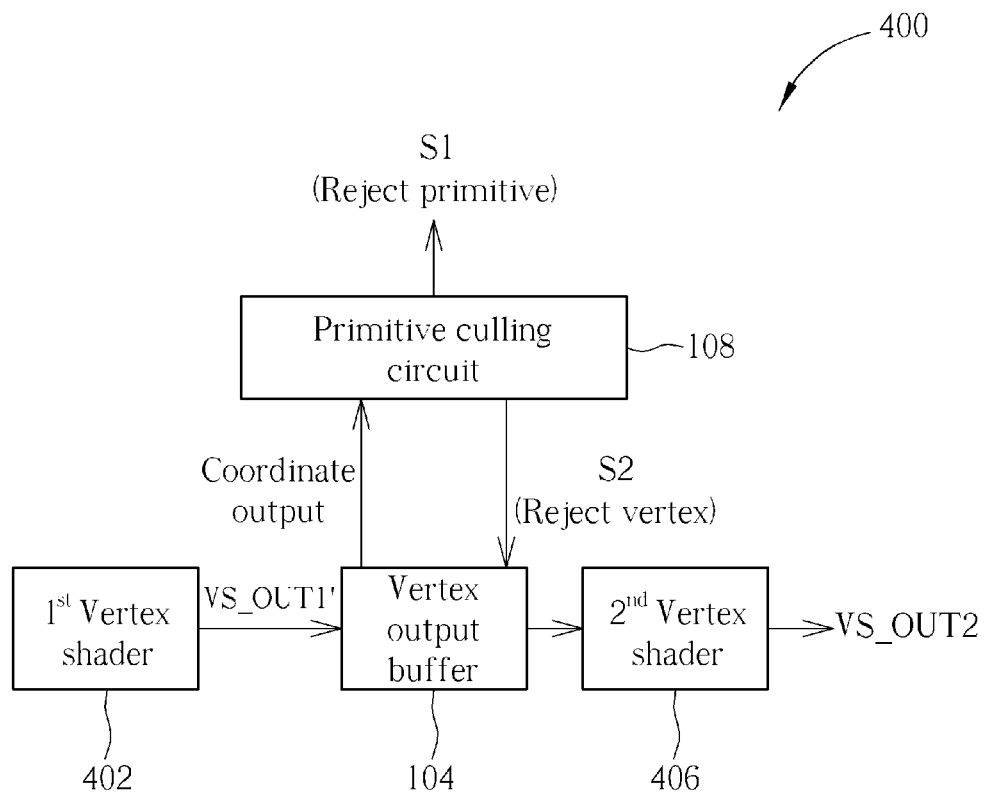
FIG. 4 is a diagram illustrating a graphics processing circuit according to a second embodiment of the present invention.

FIG. 4 is a diagram illustrating a graphics processing circuit according to a second embodiment of the present invention. By way of example, but not limitation, the graphics processing circuit 400 may be part of a graphics processing unit (GPU) used in an electronic device. In this embodiment, the graphics processing circuit 400 includes a first vertex shader 402, a second vertex shader 406, and the aforementioned vertex output buffer 104 and primitive culling circuit 108. It should be noted that only the components pertinent to the present invention are shown in FIG. 4. In practice, the graphics processing circuit 400 may have additional circuit blocks, depending upon actual design consideration.

The vertex output buffer 104 is coupled to the first vertex shader 402, the primitive culling circuit 108, and the second vertex shader 406. Hence, the vertex output buffer 104 is accessible to each of the first vertex shader 402, the primitive culling circuit 108, and the second vertex shader 406. In this embodiment, the first vertex shader 402 is configured to generate coordinate values of a plurality of vertices within image geometry, and store the coordinate values of the vertices into the vertex output buffer 104. In addition, the first vertex shader 402 is further configured to generate a plurality of intermediate values, each associated with generation of a coordinate value of one of the vertices and generation of a value of at least one user-defined variable (e.g., a varying variable as defined by OpenGL ES), to the vertex output buffer 104. That is, the data output VS_OUT1' generated from the first vertex shader 402 to the vertex output buffer 104 includes vertex coordinate values and intermediate values. Similarly, the primitive culling circuit 108 instructs the vertex output buffer 104 to reject vertices associated with rejected primitives (e.g., non-visible primitives) by removing buffered coordinate values of the rejected vertices. Hence, the second vertex shader 406 does not waste time on processing vertices associated with the rejected vertices.

In this embodiment, the second vertex shader 406 is configured to read at least a portion (i.e., part or all) of buffered coordinate values and at least a portion (i.e., part or all) of buffered intermediate values from the vertex output buffer 104, and generate the value of the at least one user-defined variable by reusing at least the portion of the buffered coordinate values and at least the portion of the buffered intermediate values. Besides the coordinate values, intermediate values may be reused by the second vertex shader 406. Since intermediate values are reused, more instructions can be skipped in the second vertex shader 406.

Figure 5:
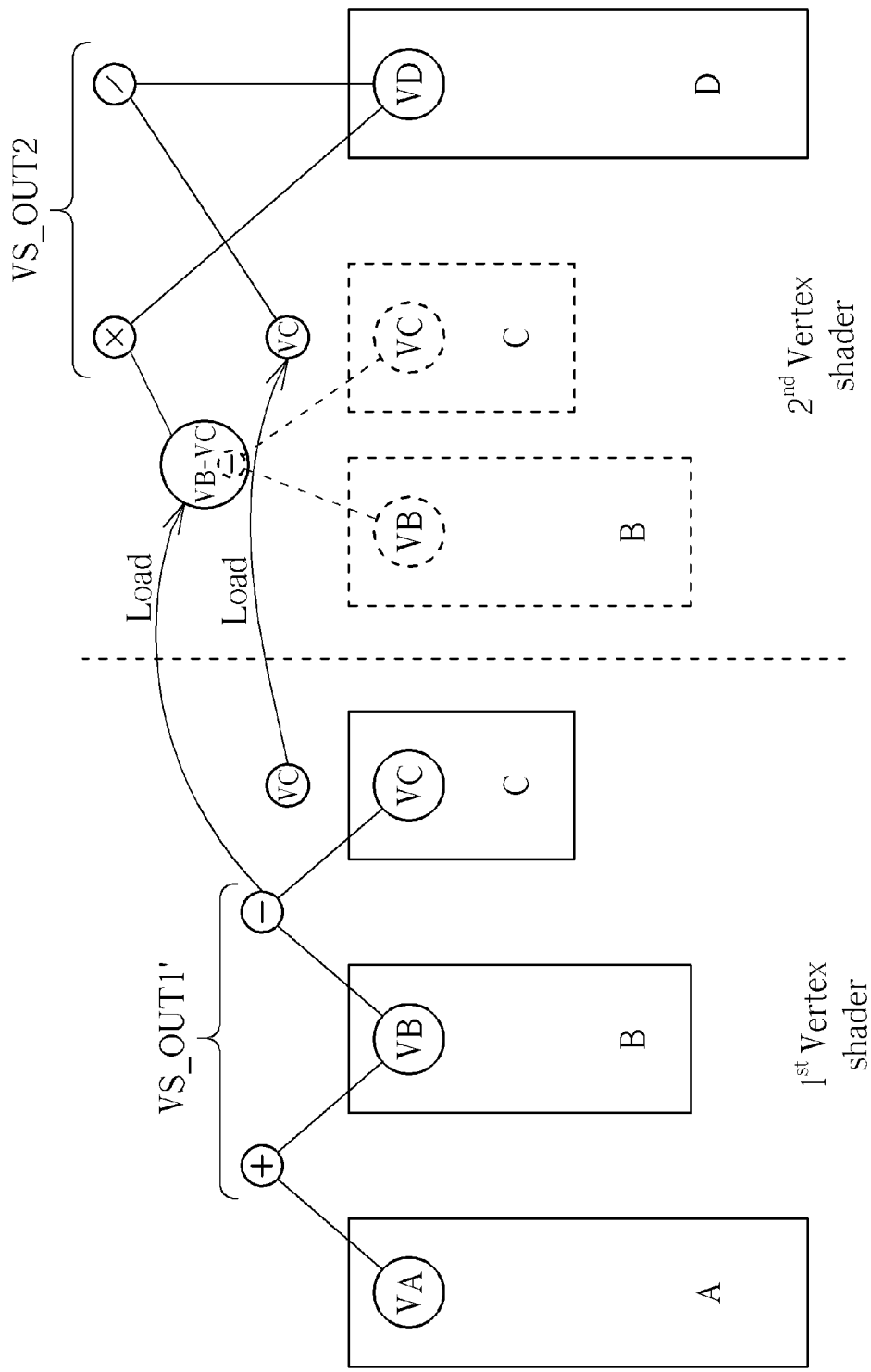
FIG. 5 is a simplified expression tree diagram illustrating a first vertex shading operation performed by a first vertex shader in FIG. 4 and a second vertex shading operation performed by a second vertex shader in FIG. 4 according to an embodiment of the present invention.

Please refer to FIG. 5, which is a simplified expression tree diagram illustrating a first vertex shading operation performed by the first vertex shader 402 in FIG. 4 and a second vertex shading operation performed by the second vertex shader 406 in FIG. 4 according to an embodiment of the present invention. The major difference between the second vertex shading operations shown in FIG. 3 and FIG. 5 is that sub-tree C's output value VC needed by the second vertex shader 406 is directly loaded from the vertex output buffer 104, rather than derived from executing instructions included in the sub-tree C. Specifically, in this example, the first vertex shader 402 is responsible for generating final output values (VA+VB) and (VB−VC) which may be vertex coordinate values, and storing the final output values (VA+VB) and (VB−VC) and the output value VC (which is an intermediate value) to the vertex output buffer 104; and the second vertex shader 104 is responsible for loading the final output values (VB−VC) and the intermediate value VC from the vertex output buffer 104, and generating final output values (VB−VC)×VD and (VC/VD) which may be varying variable values. As can be seen from FIG. 5, the first vertex shader 402 needs to execute instructions in sub-trees A, B, C and instructions corresponding to the operands "+" and "−". Since the final output values (VB−VC) and the intermediate value VC are already available in the vertex output buffer 104, the second vertex shader 406 may directly load the final output values (VB−VC) and the intermediate value VC from the vertex output buffer 104, and reuse the final output values (VB−VC) and the intermediate VC to thereby skip the execution of instructions included in the sub-trees B and C. In this way, the second vertex shader 406 executes instructions in sub-tree D and instructions corresponding to the operands "X" and "/" to generate the final output values (VB−VC)×VD and (VC/VD). Compared to the graphics processing circuit 100 shown in FIG. 1, the proposed graphics processing circuit 400 shown in FIG. 4 allows the second vertex shader 406 to execute a reduced number of instructions due to the reuse of first vertex shader's output, including at least one vertex coordinate value and at least one intermediate value.

An example of reusing the first vertex shader's output, including at least one intermediate value, may be illustrated by following program codes.

```
void main ( )
{
        vec4 tmp;
        vec3 position;
        vec3 normal = in__normal;
        vec3 tangent = in__tangent;
        decodeFromByteVec3(normal);
        decodeFromByteVec3(tangent);
#ifdef SKELETAL
        ivec4 I = ivec4(in__bone__index);
        mat3 B3 = bone__orientations[I.x] * in__bone__weight.x +
        bone__orientations[I
        vec3 T = bone__positions[I.x] * in__bone__weight.x +
        bone__positions[I.y] * i
        position = B3 * in__position + T;
        normal = B3 * normal;
        tangent = B3 * tangent;
#else
        position = in__position;
#endif
        gl__position = mvp * vec4( position, 1.0);
        out__texcoord0 = in__texcoord0;
#if defined TRANSLATE__UV
        out__texcoord0 += translate__uv;
# endif
#ifdef    LIGHTMAP
        out__texcoord1 = in__texcoord1;
#endif
#if defined LIGHTING || defined REFLECTION
        vec4 world__position = model * vec4( position, 1.0);
        out__view__dir = view__pos − world__position.xyz;
        tmp = vec4( normal, 0.0) * inv__model;
        out__normal = tmp.xyz;
        tmp = vec4( tangent, 0.0) * inv__model;
        out__tangent = tmp.xyz;
# if defined FOG
        vec4 fog__position = mv*vec4(position, 1.0);
        fog__distance = clamp (−fog__position. z*fog__density, 0.0, 1.0);
#endif
```

When the exemplary program codes are compiled and then executed, the first vertex shader 102 calculates the vertex coordinate value "gl_position" based on the intermediate value "position", and the second vertex shader 106 needs to calculate the varying variable "fog_distance" based on the varying variable "fog_position", where the varying variable "fog_position" is obtained based on the intermediate value "position". The second vertex shader 406 can get "position" from the first vertex shader 402. With the reuse of first vertex shader's output, the instruction count can be changed from 126 to 24, thus leading to enhanced performance of the second vertex shader 406.

In one exemplary design, the first vertex shader's output, including at least one vertex coordinate value and at least one intermediate value, is reused by the second vertex shader 406. However, reusing both of the vertex coordinate value and the intermediate value is for illustrative purposes only, and is not meant to be a limitation of the present invention. Any graphics processing design having a second vertex shader configured to reuse at least one intermediate value generated from a first vertex shader to generate a value of at least one variable still falls within the scope of the present invention. Specifically, the same objective of reducing the number of instructions executed in the second vertex shading stage is also achieved by reusing intermediate values.

Due to the limited storage capacity of the vertex output buffer 104, not all of the intermediate values generated during the first vertex shading operation will be stored into the vertex output buffer 104. That is, only selected intermediate values obtained from candidate intermediate values generated during the first vertex shading operation are allowed to be stored into the vertex output buffer 104 by the first vertex shader 402.

Figure 6:
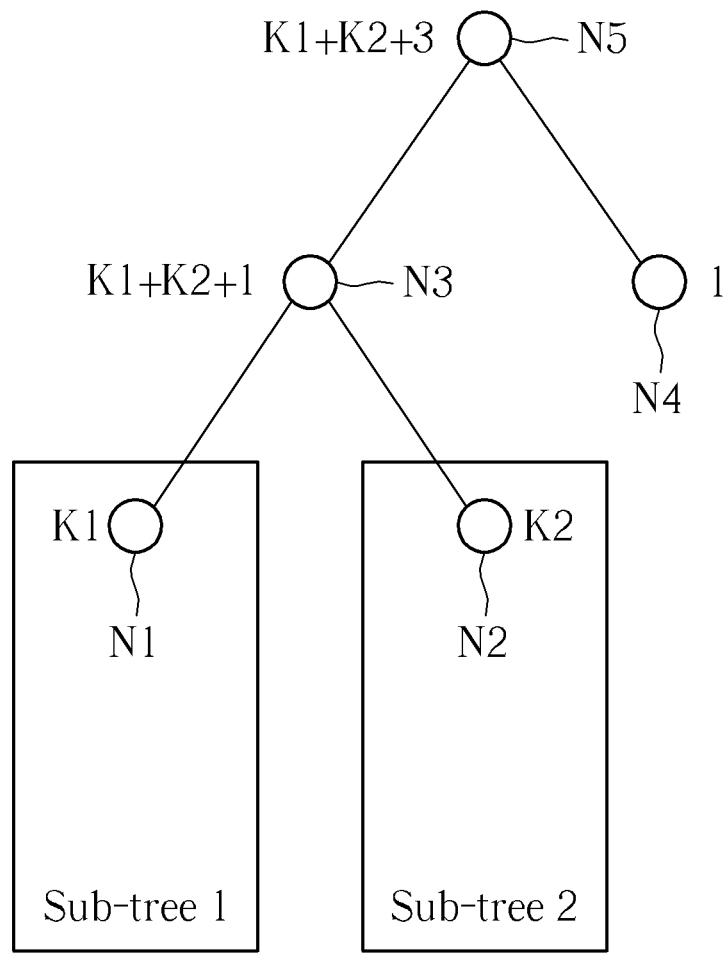
FIG. 6 is a diagram illustrating an example of calculating a weighting value for a candidate intermediate value.

In a first exemplary selection design, only values of boundary nodes are regarded as candidate intermediate values. In other words, each of the candidate intermediate values is directly used to calculate a vertex coordinate value and/or a variable value. To decide selected intermediate values from candidate intermediate values, the first vertex shader 402 is further configured to determine a plurality of weighting values for the candidate intermediate values, each associated with generation of at least one vertex coordinate value and generation of at least one variable value (e.g., a user-defined variable such as a varying variable), where a weighting value of a candidate intermediate value is proportional to the number of instructions needed to be executed for obtaining the candidate intermediate value. Please refer to FIG. 6, which is a diagram illustrating an example of calculating a weighting value for a candidate intermediate value. Suppose that node N5 is a boundary node whose value is directly used by the first vertex shader 402 to calculate a vertex coordinate value and/or directly used by the second vertex shader 402 to calculate a user-defined variable value. The sub-tree 1 includes K1 instructions/calculations involved in calculating an output value at node N1. The sub-tree 2 includes K2 instructions/calculations involved in calculating an output value at node N2. An output value at node N3 is obtained by performing one instruction based on the output values at nodes N1 and N2. An output value at node N4 is obtained by performing one instruction. An output value at node N5 (i.e., one candidate intermediate value) is obtained by performing one instruction based on the output values at nodes N3 and N4. Therefore, the weighting value for the candidate intermediate value may be set by K1+K2+3.

After weighting values of all candidate intermediate values are determined, the first vertex shader 402 compares the weighting values to select a portion of the candidate intermediate values as the selected intermediate values to be stored into the vertex output buffer 104. For example, the first vertex shader 402 sorts the weighting values of the candidate intermediate values, and then selects some candidate intermediate values, each having a weighting value larger than that possessed by remaining candidate intermediate values, as the selected intermediate values.

In a second exemplary selection design, candidate intermediate values are not necessarily the values of boundary nodes. The first vertex shader 402 is configured to determine a plurality of numbers of saved instructions (i.e., saved instruction counts) for a plurality of candidate intermediate values, each associated with generation of at least one vertex coordinate value and generation of at least one variable value (e.g., a user-defined variable such as a varying variable value).

Figure 7:
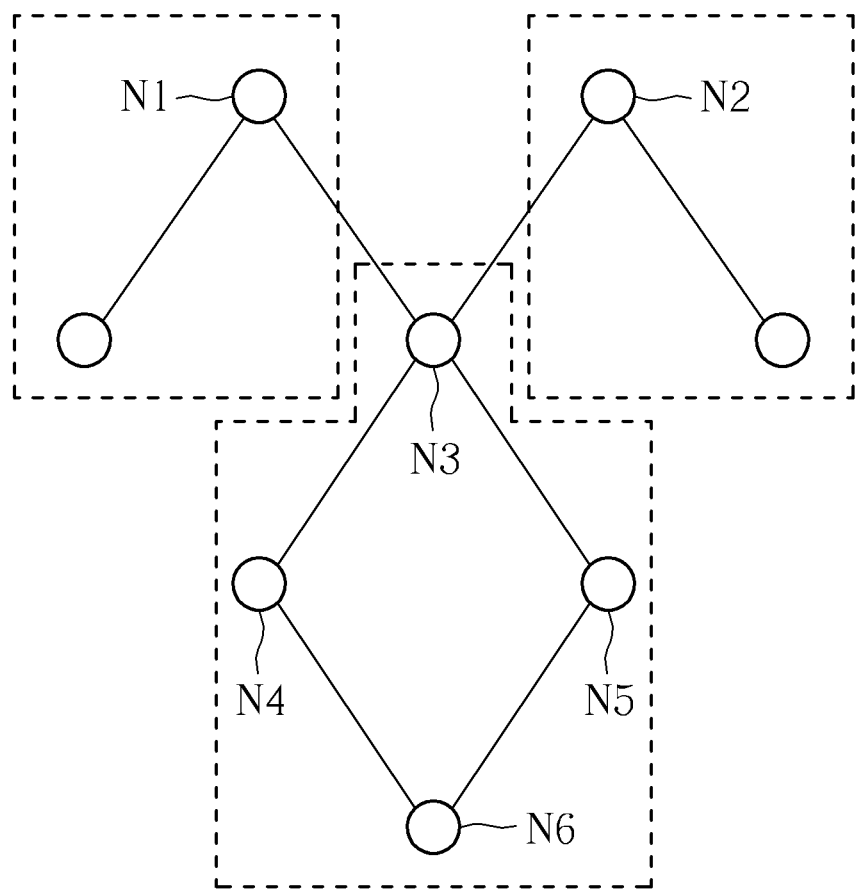
FIG. 7 is a diagram illustrating an example of calculating the number of saved instructions for a candidate intermediate value.

Please refer to FIG. 7, which is a diagram illustrating an example of calculating the number of saved instructions (i.e., a saved instruction count) for a candidate intermediate value. Suppose that the values at nodes N1, N2, and N3 are associated with generation of one vertex coordinate value in the first vertex shader 402 and generation of one variable value in the second vertex shader 406. The nodes N1 and N2 may be boundary nodes. In this example, the values at nodes N1, N2, and N3, however, are all regarded as candidate intermediate values. If the candidate intermediate value at node N1 is treated as a selected intermediate value, only two instructions are saved in the second vertex shader 406 since the value at node N3 is needed to calculate the value at node N2, and instructions used for calculating the value at node N3 will still be executed by the second vertex shader 406. If the candidate intermediate value at node N2 is treated as a selected intermediate value, only two instructions are saved in the second vertex shader 406 since the value at node N3 is needed to calculate the value at node N1, and instructions used for calculating the value at node N3 will still be executed by the second vertex shader 406. If the candidate intermediate value at node N3 is treated as a selected intermediate value, four instructions are saved in the second vertex shader 406 since node N3 is a dominant node for nodes N4, N5 and N6 located underneath. Compared to candidate intermediate values at nodes N1 and N2, the candidate intermediate value at node N3 can save more instructions when reused by the second vertex shader 406. Hence, the candidate intermediate value at node N3 is selected and stored into the vertex output buffer 104 due to a larger saved instruction count.

After the numbers of saved instructions (i.e., saved instruction counts) for all candidate intermediate values are determined, the first vertex shader 402 compares the saved instruction counts to select a portion of the candidate intermediate values as the selected intermediate values to be stored in to the vertex output buffer. For example, the first vertex shader 402 sorts the saved instruction counts of the candidate intermediate values, and then selects some candidate intermediate values, each having a saved instruction count larger than that possessed by remaining candidate intermediate values, as the selected intermediate values.

Figure 8:
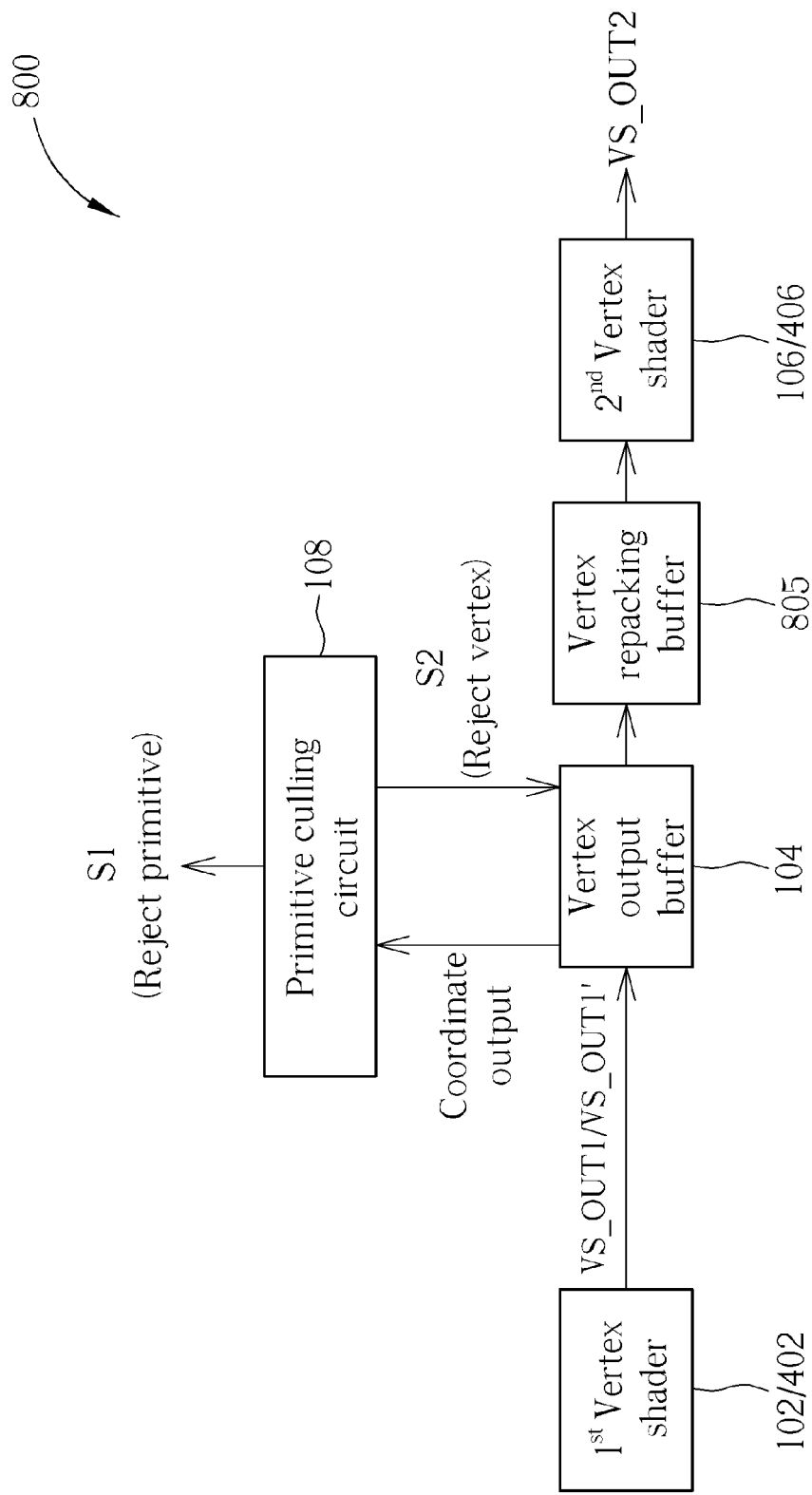
FIG. 8 is a diagram illustrating a graphics processing circuit according to a third embodiment of the present invention.

In an exemplary design, each vertex shader may be implemented using a SIMD (single-instruction multiple-data) programmable shader for achieving better performance. The present invention further proposes improving utilization of SIMD lanes through a compact vertex thread group. FIG. 8 is a diagram illustrating a graphics processing circuit according to a third embodiment of the present invention. By way of example, but not limitation, the graphics processing circuit 800 may be part of a graphics processing unit (GPU) used in an electronic device. In this embodiment, the graphics processing circuit 800 includes a vertex repacking circuit 805 and the aforementioned first vertex shader 102 (or 402), second vertex shader 106 (or 406), vertex output buffer 104 and primitive culling circuit 108. It should be noted that only the components pertinent to the present invention are shown in FIG. 8. In practice, the graphics processing circuit 800 may have additional circuit blocks, depending upon actual design consideration.

To further increase vertex shading performance, a vertex shader may employ processing techniques such as pipelining that attempts to process in parallel as much graphics data as possible. For example, a vertex shader with SIMD architecture is designed to maximize the amount of parallel processing in the graphics pipeline. In accordance with the SIMD architecture, the same instruction is executed in parallel to process multiple data inputs. That is, threads of one thread group are synchronously executed through a plurality of SIMD lanes. In this embodiment, the second vertex shader 106/406 may be a SIMD programmable shader with a fixed number of SIMD lanes (i.e., execution units). As mentioned above, the primitive culling circuit 108 instructs the vertex output buffer 104 to reject vertices associated with rejected primitives (e.g., non-visible primitives) by removing buffered coordinate values of the rejected vertices. Hence, the second vertex shader 106/406 does not waste time on processing vertices associated with the rejected vertices. However, when certain vertices are rejected, original vertex thread groups would have masked-out threads due to rejected vertices. When an original vertex thread group with at least one rejected vertex is processed by the second vertex shader 106/406 with SIMD architecture, at least one of the SIMD lanes is idle (i.e., non-active), which results in underutilization of the second vertex shader 106/406. FIG. 9 is a diagram illustrating a SIMD execution flow without compaction. Suppose that the second vertex shader 106/406 is a SIMD programmable shader having four SIMD lanes L0, L1, L2, L3. The original vertex thread groups G0, G1, G2, G3, G4 are sequentially processed by the second vertex shader 106/406 in different cycles. As shown in FIG. 9, the original vertex thread group G0 includes threads $T_{00}$, $T_{01}$, $T_{02}$, $T_{03}$; the original vertex thread group G1 includes threads $T_{10}$, $T_{11}$, $T_{12}$, $T_{13}$; the original vertex thread group G2 includes threads $T_{20}$, $T_{21}$, $T_{22}$, $T_{23}$; the original vertex thread group G3 includes threads $T_{30}$, $T_{31}$, $T_{32}$, $T_{33}$; and the original vertex thread group G4 includes threads $T_{40}$, $T_{41}$, $T_{42}$, $T_{43}$. In this example, the threads $T_{01}$, $T_{13}$, $T_{22}$, $T_{40}$ are masked-out threads due to rejected vertices. Hence, when the original vertex thread group G0 is processed by the second vertex shader 106/406, the SIMD lane L1 is non-active; when the original vertex thread group G1 is processed by the second vertex shader 106/406, the SIMD lane L3 is non-active; when the original vertex thread group G2 is processed by the second vertex shader 106/406, the SIMD lane L2 is non-active; and when the original vertex thread group G4 is processed by the second vertex shader 106/406, the SIMD lane L0 is non-active. Each of the threads $T_{00}$, $T_{02}$-$T_{03}$, $T_{10}$-$T_{12}$, $T_{20}$-$T_{21}$, $T_{23}$, $T_{30}$-$T_{33}$, $T_{41}$-$T_{43}$ is filled with one non-rejected vertex to be processed. Hence, when the original vertex thread groups G0, G1, G2, G3, G4 are sequentially processed by the second vertex shader 106/406, five cycles are needed to accomplish the vertex shading processing of the non-rejected vertices.

The present invention proposes using thread group compaction for achieving better SIMD utilization. The vertex repacking circuit 805 is coupled between the vertex output buffer 104 and the second vertex shader 106/406. In this embodiment, the vertex repacking circuit 805 is configured to repack non-rejected vertices from original vertex thread groups having at least one rejected vertex to form a new vertex thread group filled with non-rejected vertices only, and output the new vertex thread group to the second vertex shader 106/406 with SIDM architecture. FIG. 10 is a diagram illustrating a SIMD execution flow with compaction. As shown in FIG. 10, the new vertex thread groups G0', G1', G2', G3' are sequentially processed by the second vertex shader 106/406 in different cycles. The new vertex thread group G0' includes threads $T_{00}$, $T_{02}$, $T_{03}$, $T_{10}$, each filled with one non-rejected vertex to be processed; the new vertex thread group G1' includes threads $T_{11}$, $T_{12}$, $T_{20}$, $T_{21}$, each filled with one non-rejected vertex to be processed; the new vertex thread group G2' includes threads $T_{23}$, $T_{30}$, $T_{31}$, $T_{32}$, each filled with one non-rejected vertex to be processed; and the new vertex thread group G3' includes threads $T_{33}$, $T_{41}$, $T_{42}$, $T_{43}$, each filled with one non-rejected vertex to be processed. Since each of the new vertex thread groups G0'-G3' includes no masked-out thread due to the proposed vertex repacking, the SIMD lanes L0-L3 are fully utilized when the second vertex shader 106/406 processes each of the new vertex thread groups G0'-G3'. Compared to the execution flow shown in FIG. 9, the execution flow shown in FIG. 10 only needs four cycles to accomplish the vertex shading processing of the non-rejected vertices. In this way, the performance of the second vertex shader 106/406 is enhanced due to better SIMD utilization.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A graphics processing circuit, comprising:
   a buffer;
   a first vertex shader, configured to generate at least coordinate values of a plurality of vertices to the buffer;
   a second vertex shader, configured to read at least a portion of buffered coordinate values from the buffer, and reuse at least the portion of the buffered coordinate values to generate a value of at least one user-defined variable; and
   a primitive culling circuit, configured to reject at least one primitive and instruct the buffer to reject vertices associated with the at least one rejected primitive by removing buffered coordinate values of the rejected vertices.

2. The graphics processing circuit of claim 1, further comprising:
   a vertex repacking circuit, configured to repack non-rejected vertices from original vertex thread groups having at least one rejected vertex to form a new vertex thread group filled with non-rejected vertices only, and output the new vertex thread group to the second vertex shader.

3. The graphics processing circuit of claim 1, wherein the first vertex shader is further configured to generate a plurality of selected intermediate values, each associated with generation of a coordinate value of one of the vertices and generation of the value of the at least one user-defined variable, to the buffer; and the second vertex shader is further configured to read at least a portion of buffered selected intermediate values from the buffer, where the second vertex shader generates the value of the at least one user-defined variable by reusing at least the portion of the buffered coordinate values and at least the portion of the buffered selected intermediate values.

4. The graphics processing circuit of claim 3, wherein the first vertex shader is further configured to determine a plurality of weighting values for a plurality of candidate intermediate values, each associated with generation of a coordinate value of one of the vertices and generation of the value of the at least one user-defined variable, and compare the weighting values to select a portion of the candidate intermediate values as the selected intermediate values.

5. The graphics processing circuit of claim 4, wherein a weighting value of a candidate intermediate value is proportional to a number of instructions needed to be executed for obtaining the candidate intermediate value.

6. The graphics processing circuit of claim 4, wherein each of the candidate intermediate values is directly used to calculate a coordinate value of one of the vertices.

7. The graphics processing circuit of claim 4, wherein each of the candidate intermediate values is directly used to calculate the value of the at least one user-defined variable.

8. The graphics processing circuit of claim 3, wherein the first vertex shader is further configured to determine a plurality of numbers of saved instructions for a plurality of candidate intermediate values, each associated with generation of a coordinate value of one of the vertices and generation of the value of the at least one user-defined variable, and compare the numbers of saved instructions to select a portion of the candidate intermediate values as the selected intermediate values.

9. The graphics processing circuit of claim 1, wherein the at least one user-defined variable comprises at least one varying variable as defined by OpenGL ES (OpenGL for Embedded Systems).

10. A graphics processing method, comprising:
    performing a first vertex shading operation to generate at least coordinate values of a plurality of vertices to a buffer;
    performing a second vertex shading operation to read at least a portion of buffered coordinate values from the buffer, and reuse at least the portion of the buffered coordinate values to generate a value of at least one user-defined variable;
    rejecting at least one primitive; and
    instructing the buffer to reject vertices associated with the at least one rejected primitive by removing buffered coordinate values of the rejected vertices.

11. The graphics processing method of claim 10, further comprising:
    repacking non-rejected vertices from original vertex thread groups having by at least one rejected vertex to form a new vertex thread group filled with non-rejected vertices only; and
    feeding the new vertex thread group into the second vertex shading operation.

12. The graphics processing method of claim 10, wherein the first vertex shading operation further generates a plurality of selected intermediate values, each associated with generation of a coordinate value of one of the vertices and generation of the value of the at least one user-defined variable, to the buffer; and the second vertex shading operation further reads at least a portion of buffered selected intermediate values from the buffer, where the value of the at least one user-defined variable is generated by reusing at least the portion of the buffered coordinate values and at least the portion of the buffered selected intermediate values.

13. The graphics processing method of claim 12, wherein the first vertex shading operation further determines a plurality of weighting values for a plurality of candidate intermediate values, each associated with generation of a coordinate value of one of the vertices and generation of the value of the at least one user-defined variable, and compares the weighting values to select a portion of the candidate intermediate values as the selected intermediate values.

14. The graphics processing method of claim 13, wherein a weighting value of a candidate intermediate value is proportional to a number of instructions needed to be executed for obtaining the candidate intermediate value.

15. The graphics processing method of claim 13, wherein each of the candidate intermediate values is directly used to calculate a coordinate value of one of the vertices.

16. The graphics processing method of claim 13, wherein each of the candidate intermediate values is directly used to calculate the value of the at least one user-defined variable.

17. The graphics processing method of claim 12, wherein the first vertex shading operation further determines a plurality of numbers of saved instructions for a plurality of candidate intermediate values, each associated with generation of a coordinate value of one of the vertices and generation of the value of the at least one user-defined variable, and compares the numbers of saved instructions to select a portion of the candidate intermediate values as the selected intermediate values.

18. The graphics processing method of claim 10, wherein the at least one user-defined variable comprises at least one varying variable as defined by OpenGL ES (OpenGL for Embedded Systems).

19. A graphics processing circuit, comprising:
a buffer;
a first vertex shader, configured to generate coordinate values of a plurality of vertices, and store at least one intermediate value, each associated with generation of a coordinate value of one of the vertices, to the buffer; and
a second vertex shader, configured to read the at least one intermediate value from the buffer, and reuse the at least one intermediate value to generate a value of at least one variable.

20. A graphics processing method, comprising:
performing a first vertex shading operation to generate coordinate values of a plurality of vertices, and store at least one intermediate value, each associated with generation of a coordinate value of one of the vertices, to a buffer; and
performing a second vertex shading operation to read the at least one intermediate value from the buffer, and reuse the at least one intermediate value to generate a value of at least one variable.

* * * * *